United States Patent
Leung et al.

(10) Patent No.: US 12,519,816 B2
(45) Date of Patent: Jan. 6, 2026

(54) APPARATUS AND METHOD FOR ANALYSIS OF CYBER THREAT INTELLIGENCE

(71) Applicant: Hong Kong Applied Science and Technology Research Institute Company Limited, Hong Kong (HK)

(72) Inventors: Ting Chung Leung, Hong Kong (HK); Wai Kei Ricky Leung, Hong Kong (HK); Ka Yuk Lee, Hong Kong (HK); Yanqing Li, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 359 days.

(21) Appl. No.: 18/309,782

(22) Filed: Apr. 29, 2023

(65) Prior Publication Data

US 2024/0364731 A1   Oct. 31, 2024

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01); *H04L 63/1425* (2013.01)

(58) Field of Classification Search
CPC ............. H04L 63/1433; H04L 63/1425; H04L 63/1416; H04L 41/16
See application file for complete search history.

(56) References Cited

U.S. PATENT DOCUMENTS 9,813,435 B2   11/2017   Muddu et al.
10,230,599 B2   3/2019   Pietrowicz et al.
(Continued)

FOREIGN PATENT DOCUMENTS

CN   105897751 A   8/2016
CN   110138784 A   8/2019
(Continued)

OTHER PUBLICATIONS

Ting-Chung Leung et al., "Flow-Based DDoS Detection Using Deep Neural Network with Radial Basis Function Neural Network", 2022 Asia-Pacific Signal and Information Processing Association Annual Summit and Conference, Institute of Electrical and Electronics Engineers, Nov. 2022, pp. 1771-1776.
(Continued)

*Primary Examiner* — Patrice L Winder
(74) *Attorney, Agent, or Firm* — Idea Intellectual Limited; Sam T. Yip

(57) ABSTRACT

An apparatus for analysing and monitoring a network flow for cyber threat intelligence is provided. The apparatus includes a feature selection model, a feature classification model, a threat computation model, a cyber threat intelligence engine, and a monitoring system. The feature selection model is configured to select flow-based features from a dataset in a network flow to generate network flow meta. The feature classification model is configured to analysis the flow-based features of the network flow meta to generate classified features. The threat computation model is configured to predict the threat features from the classified features using a swappable prediction model. The cyber threat intelligence engine is configured to collect and combine the flow-based features, the classified features, and the threat features to form one or more cyber threat joint features. The monitoring system is configured to output the cyber threat joint features.

16 Claims, 8 Drawing Sheets

(56) References Cited

U.S. PATENT DOCUMENTS

| | | | |
|---|---|---|---|
| 2015/0215334 A1 | 7/2015 | Bingham et al. | |
| 2015/0326600 A1 | 11/2015 | Karabatis et al. | |
| 2019/0188212 A1 | 6/2019 | Miller et al. | |
| 2022/0150275 A1* | 5/2022 | McNee | H04L 63/1441 |
| 2022/0210171 A1* | 6/2022 | Grossman | H04L 63/10 |
| 2022/0224706 A1* | 7/2022 | Peng | H04L 63/1425 |
| 2022/0263842 A1* | 8/2022 | Chen | H04L 61/5061 |
| 2023/0136037 A1* | 5/2023 | Sesha | H04L 41/0816 709/224 |
| 2023/0144836 A1* | 5/2023 | Nakar | H04L 63/1416 726/13 |

FOREIGN PATENT DOCUMENTS

| | | | | |
|---|---|---|---|---|
| CN | 110912889 A | 3/2020 | | |
| CN | 111586046 B | 2/2021 | | |
| CN | 113098862 A | 7/2021 | | |
| CN | 110896381 B | 10/2021 | | |
| EP | 3346666 A1 * | 7/2018 | ......... | H04L 63/1491 |
| WO | 2015134008 A1 | 9/2015 | | |
| WO | 2021103135 A1 | 6/2021 | | |

OTHER PUBLICATIONS

"K-means clustering", https://www.wikiwand.com/en/K-means_clustering, 1957.

International Search Report and Written Opinion of corresponding PCT application No. PCT/CN2023/097034 mailed on Nov. 30, 2023.

\* cited by examiner

FIG. 4

Network flow dataset

| | | | | |
|---|---|---|---|---|
| Flow duration | Bwd Packet Length Max | Fwd IAT Max | Packet Length Std | down/Up Ratio | Subflow Fwd Packets | ~~Active Max~~ |
| total Fwd Packet | Bwd Packet Length Mean | Fwd IAT Mean | Packet Length Variance | Average Packet Size | Subflow Fwd Bytes | ~~Active Std~~ |
| total Bwd packets | Bwd Packet Length Std | Fwd IAT Std | FIN Flag Count | Fwd Segment Size Avg | ~~Subflow Bwd Packets~~ | Idle Min |
| total Length of Fwd Packet | Flow Bytes/s | Fwd IAT Total | SYN Flag Count | Bwd Segment Size Avg | Subflow Bwd Bytes | Idle Mean |
| total Length of Bwd Packet | Flow Packets/s | Bwd IAT Min | RST Flag Count | ~~Fwd Bytes/Bulk Avg~~ | Fwd Init Win bytes | Idle Max |
| Fwd Packet Length Min | Flow IAT Mean | Bwd IAT Max | PSH Flag Count | ~~Fwd Packet/Bulk Avg~~ | Bwd Init Win bytes | Idle Std |
| Fwd Packet Length Max | Flow IAT Std | Bwd IAT Mean | ACK Flag Count | ~~Fwd Bulk Rate Avg~~ | Fwd Act Data Pkts | |
| Fwd Packet Length Mean | Flow IAT Max | Bwd IAT Std | ~~URG Flag Count~~ | ~~Bwd Bytes/Bulk Avg~~ | Fwd Seg Size Min | |
| Fwd Packet Length Std | Flow IAT Min | Bwd IAT Total | CWR Flag Count | Bwd Packet/Bulk Avg | ~~Active Min~~ | |
| Bwd Packet Length Min | Fwd IAT Min | Fwd PSH flags | ECE Flag Count | Bwd Bulk Rate Avg | ~~Active Mean~~ | |
| | | ~~Bwd PSH Flags~~ | | | | |
| | | ~~Fwd URG Flags~~ | | | | |
| | | ~~Bwd URG Flags~~ | | | | |
| | | Fwd Header Length | | | | |
| | | Bwd Header Length | | | | |
| | | FWD Packets/s | | | | |
| | | Bwd Packets/s | | | | |
| | | Packet Length Min | | | | |
| | | Packet Length Max | | | | |
| | | Packet Length Mean | | | | |

FIG. 5

| Label | property | Label | property |
|---|---|---|---|
| Flow duration | Long | Flow Packets/s | High Volume |
| total Fwd Packet | High Volume | Fwd Header Length | Short |
| total Length of Fwd Packet | Short | FWD Packets/s | High Volume |
| Fwd Packet Length Min | Equal to Fwd Packet Length Max | Packet Length Mean | Short |
| Fwd Packet Length Max | Equal to Fwd Packet Length Min | SYN Flag Count | High Volume |
| Fwd Packet Length Mean | Short | ACK Flag Count | Equal to 0 |
| Flow Bytes/s | High Volume | Fwd Segment Size Avg | Small |
| Idle Min | Equal to Idle Max | Idle Max | Equal to Idle Min |

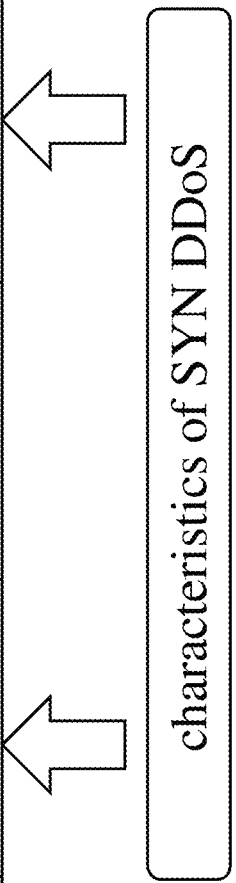

characteristics of SYN DDoS

FIG. 7

APPARATUS AND METHOD FOR ANALYSIS OF CYBER THREAT INTELLIGENCE

TECHNICAL FIELD

The present invention relates to machine learning techniques in analyzing and monitoring a network flow for cyber threat intelligence.

BACKGROUND

Cyber threats have become a serious concern in recent years as internet usage has increased, making personal information and property vulnerable to theft. In response, there has been a significant effort invested in developing cyber threat intelligence analysis methods. Most of the existing methods are network packet-based, so there is a challenge of a lack of information for machine learning (ML)-based analysis. Network flow, on the other hand, provides more information that can be used as features for ML. Some attacks can only be detected in network flows, or sessions. However, network flow information is bulky and presents a challenge for edge computing and large-scale cyber threat intelligence analysis.

Existing analytics or classification methods, such as Security Information and Event Management (SIEM), provide two primary capabilities: (1) reporting and forensics on security incidents, and (2) alerts based on analytics that match a certain rule set, indicating a security issue. However, SIEM is rule-based, which requires expert knowledge to analyze and deploy. Rule-based classification methods like SIEM are also easy to bypass, leaving vulnerabilities in the system. One example of such an attack is the synchronize (SYN) attack or SYN distributed denial-of-service (DDoS) attack, which can exhaust the resources of victim systems. In this regard, SYN DDoS packet with frequency below entropy is easy to bypass.

Currently, there are no existing ML-based cyber threat intelligence prediction algorithms on the market. Therefore, there is a need to develop a system that can enable cyber threat intelligence more effectively. A system is required, which is able to detect and even predict attacks and reduce false positives, so it can help analysts to identify and respond to threats more efficiently.

SUMMARY OF INVENTION

It is an objective of the present invention to provide an apparatus and a method to address the aforementioned shortcomings and unmet needs in the state of the art. In accordance with a first aspect of the present invention, an apparatus for analysing and monitoring a network flow for cyber threat intelligence is provided. The apparatus comprises a flow detector, a feature extraction model, a feature selection model, a feature classification model, a threat computation model, a cyber threat intelligence engine, a user interface, and a monitoring system. The feature selection model is executed by at least one processor and is configured to select one or more flow-based features from a dataset in the network flow to generate one or more network flow meta. The feature classification model is executed by at least one processor and is configured to analysis the flow-based features of the network flow meta to generate classified features. The threat computation model is executed by at least one processor and is configured to compute one or more threat features from the classified features using on a swappable prediction model capable of mapping classified features to threat features (i.e., cyber-attack threats to be occurred in a specific future time period). The cyber threat intelligence engine is executed by at least one processor and is configured to collect and combine the flow-based features, the classified features, and the threat features to form one or more cyber threat joint features. The monitoring system is executed by at least one processor and is configured to receive the cyber threat joint features for monitoring.

In accordance with a second aspect of the present invention, a method for analysing and monitoring a network flow for cyber threat intelligence is provided. The method comprises the steps: determining whether the received network flow's raw data is of the network flow type or not; and in the latter case, extracting the flow-based features from the network flow; selecting one or more flow-based features in the network flow to generate a network flow meta, which are descriptive information on the network such as structures of the network communication protocols and data packets; analysing the flow-based features of the network flow meta to generate classified features; predicting threat features from the classified features based on a swappable prediction model; collecting and combining the flow-based features, the classified features, and the threat features to form one or more cyber threat joint features; and outputting the cyber threat joint features to a monitoring system.

In accordance with a third aspect of the present invention, a method for training the feature selection model of the apparatus for cyber threat intelligence is provided. The method comprises the steps: obtaining a training dataset comprising network traffic data with packet or flow format of one or more cyber-attack simulations; parsing a plurality of packets of the training dataset into a plurality of sessions; extracting statistical network traffic features from the sessions; calculating separately the statistical network traffic features in forward and backward directions; calculating weights to be assigned to the statistical network traffic features; and dropping a group of the statistical network traffic features, which are assigned zero weights by the feature selection model.

In accordance with a fourth aspect of the present invention, a method for training the feature classification model of the apparatus for cyber threat intelligence is provided. The method comprises the steps: obtaining a training dataset comprising network traffic data associated known cyber-attack events; feeding statistical network traffic features of the training dataset to features selection so as to reduce the number of the statistical network traffic features; training a deep neutral network (DNN) model of the feature classification model using the selected statistical network traffic features; and feeding the statistical network traffic features of the training dataset to the trained DNN model for testing without any features selection, so as to evaluate the DNN model on a subset of the selected statistical network traffic features, thereby measuring and adjusting a weight distribution of the DNN model related to characteristics of the statistical network traffic features of the known cyber-attack events.

By the embodiments of the present invention, the ML-based analysis for cyber threat intelligence is achieved, which provides more accurate classification of cyber-attack in a the target network flow. Moreover, as the feature selection is performed, the number of the features to be processed is reduced, and in turn improving the applied deep learning model's performance and lower the system loading.

BRIEF DESCRIPTION OF DRAWINGS

Embodiments of the invention are described in more details hereinafter with reference to the drawings, in which:

FIG. 4 depicts an exemplary result of features extraction in accordance with an embodiment of the present invention;

FIG. 5 depicts an exemplary result of features selection in accordance with an embodiment of the present invention;

FIG. 7 depicts an exemplary result of features classification in accordance with an embodiment of the present invention.

DETAILED DESCRIPTION OF THE INVENTION

In the following description, apparatuses and methods of ML-based analysis for cyber threat intelligence and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
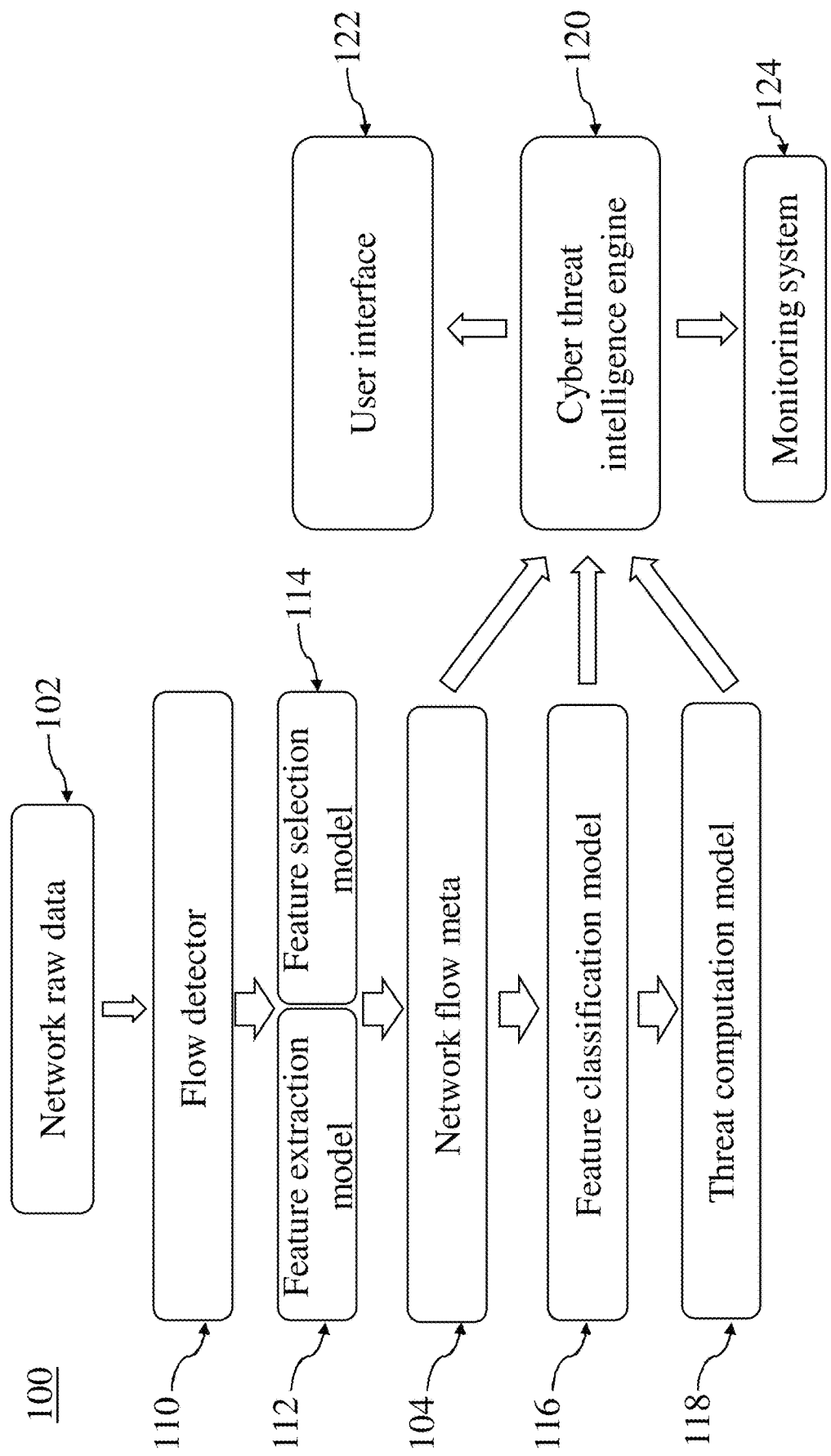
FIG. 1 depicts a schematic diagram of an apparatus for generating cyber threat intelligence in accordance with a first aspect of the present invention.
Figure 2:
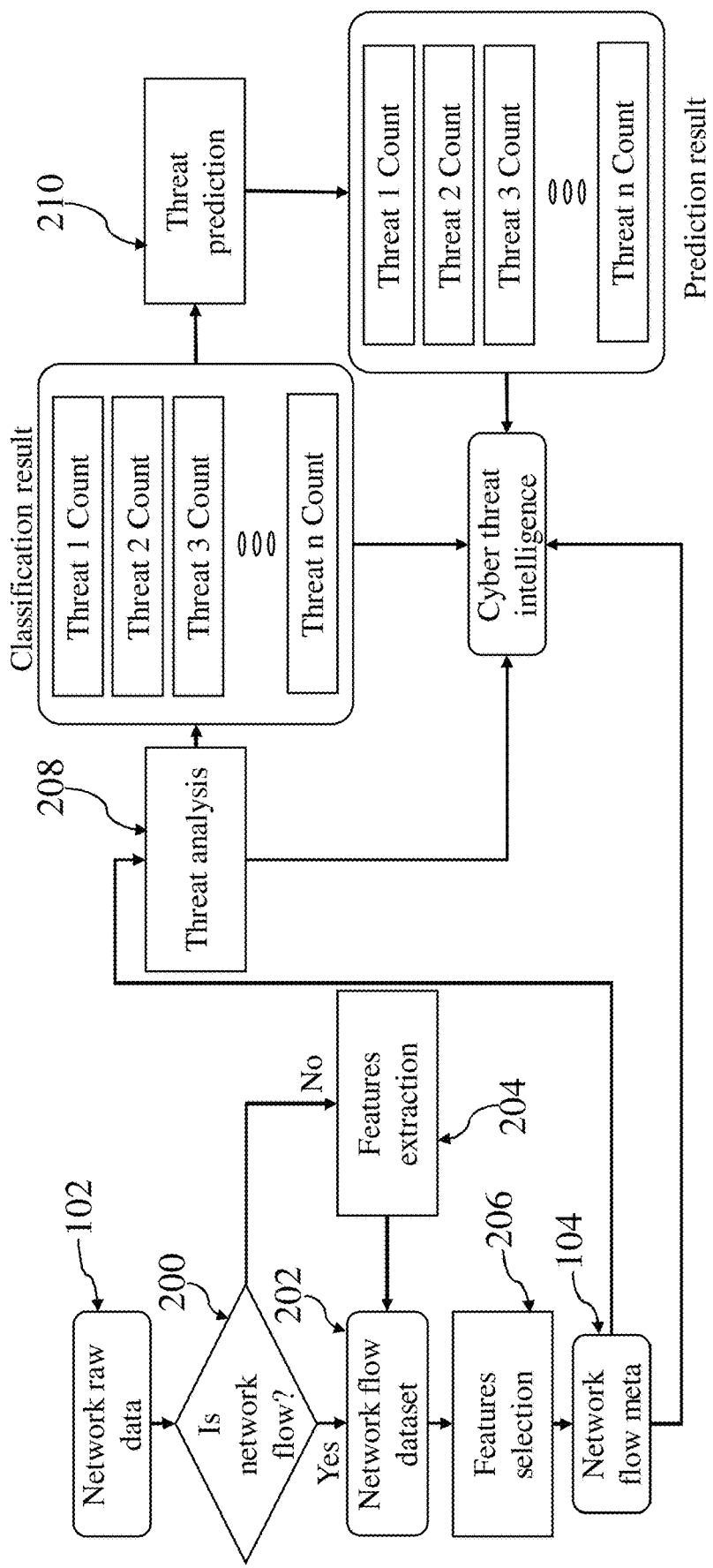
FIG. 2 depicts a schematic diagram of a method for generating cyber threat intelligence in accordance with a second aspect of the present invention using an apparatus of FIG. 1 in accordance with a second aspect of the present invention.

FIG. 1 depicts a schematic diagram of an apparatus 100 for generating cyber threat intelligence in accordance with the first aspect of the present invention. In accordance with an embodiment, the apparatus 100 for analysing and monitoring a network flow for cyber threat intelligence comprises a flow detector 110, a feature extraction model 112, a feature selection model 114, a feature classification model 116, a threat computation model 118, a cyber threat intelligence engine 120, a user interface 122, and a monitoring system 124, executed by at least one processor and configured to operate a method as shown in FIG. 2.

After the apparatus 100 receives the network raw data 102 as input, step 200 executed by the flow detector 110 follows. The flow detector 110 is configured to determine whether the network raw data 102 is of a network flow type or not. In the case where the network raw data 102 is of the network flow type, step 202 is executed for collecting and arranging the network raw data 102 into a network flow dataset. On the other hand, in the case where the network raw data 102 is not of the network flow type, step 204 is executed by the feature extraction model 112 for features extraction.

Figure 3:
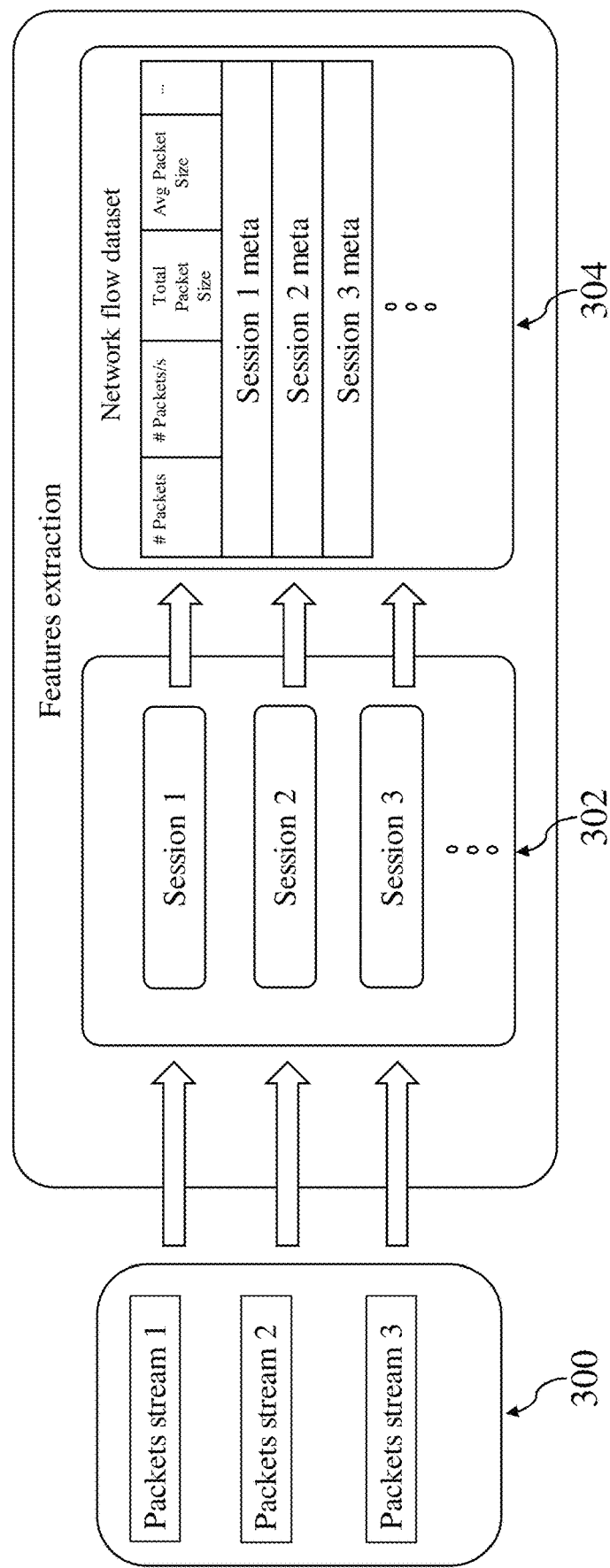
FIG. 3 depicts a schematic diagram of features extraction in accordance with an embodiment of the present invention.

With respect to step 204, FIG. 3 depicts a schematic diagram of the features extraction executed by the feature extraction model 112 in accordance with an embodiment of the present invention. In the features extraction, one or more packets of the packets stream 300 of the network raw data 102 are parsed into multiple sessions 302, and then properties thereof are extracted from the sessions 302. One or more statistical network traffic features are calculated separately in the forward and backward directions from the sessions 302 based on the extracted properties such as duration, number of packets, number of bytes, length of packets, etc. and arranged into the session meta 304. The generated session meta 304 is then output as a network flow dataset.

Figure 4:
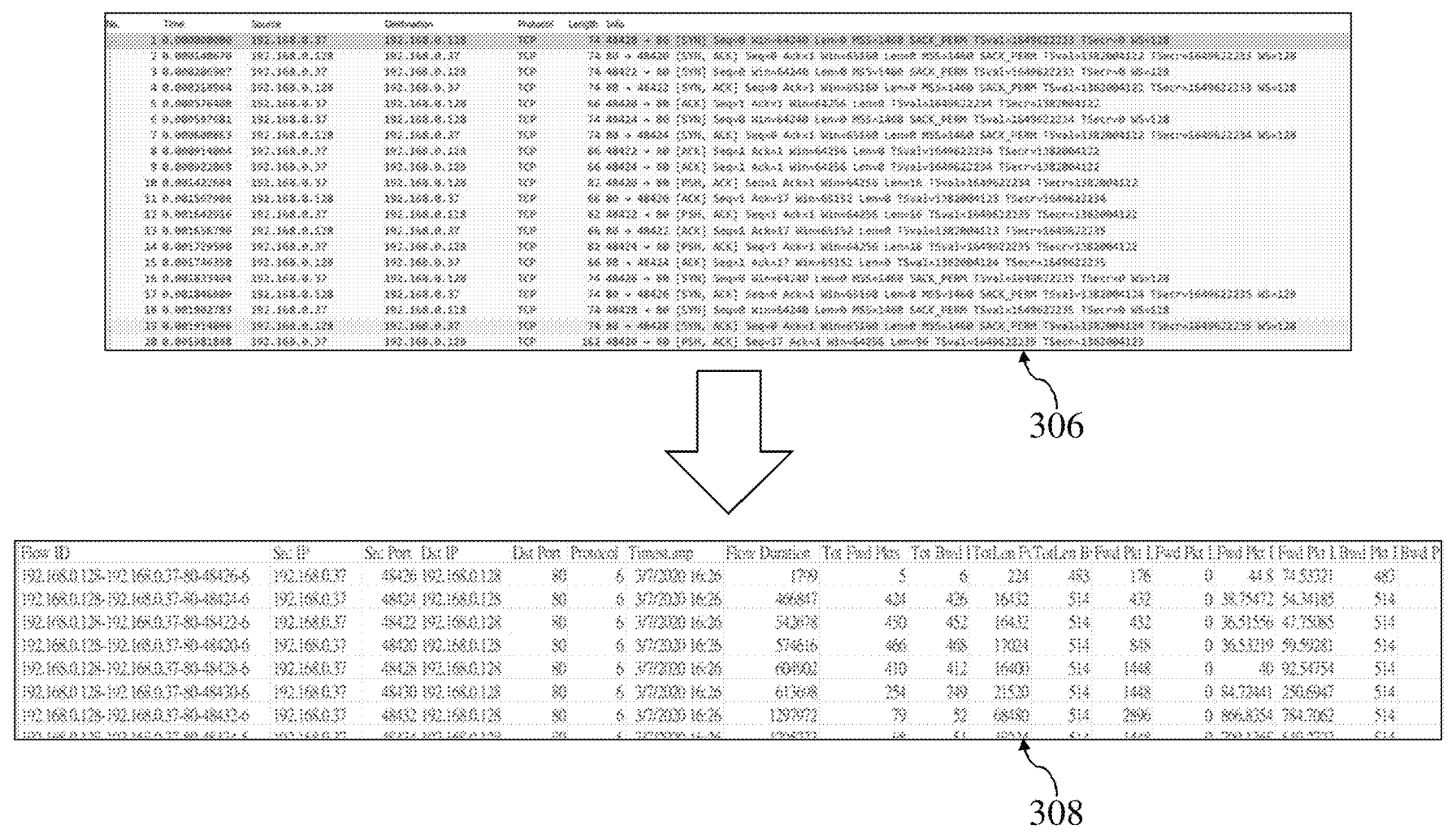

FIG. 4 depicts an exemplary result of the features extraction in accordance with an embodiment of the present invention. In this example, the features extraction is executed on the original packets stream 306. The statistical network traffic features 308 are extracted, calculated, and arranged into a session meta to be output as a network flow dataset.

Referring back to FIG. 2, after the network raw data 102 is arranged into a network flow dataset, step 206 is executed by the feature selection model 114 for features selection on the network flow dataset. FIG. 5 depicts an exemplary result of features selection in accordance with an embodiment of the present invention. As illustrated in FIG. 5, a network flow dataset is shown to having flow-based statistical network traffic features as labelled, which are to be selected or dropped by the feature selection model 114.

In one embodiment, the feature selection model 114 is trained to select one or more flow-based statistical network traffic features to generate a network flow meta. The training is achieved by learning features from a training dataset comprising the network traffic in packet or flow format of one or more cyber-attack simulations. The features selection aims to drop or ignore some of the flow-based statistical network traffic features not directly related to cyber-attacks, thereby lowering the system loading. The selected flow-based statistical network traffic features are then used for generating the network flow meta 104.

In the example illustrated in FIG. 5, a group of the flow-based statistical network traffic features is dropped or ignored by the features selection, including backward packet PSH flags (Bwd PSH Flags), forward packet URG flags (Fwd URG Flags), backward packet URG flags (Bwd URG Flags), total number of packets with the URG flag set (URG Flag Count), average number of bytes per bulk of forward traffic (Fwd Bytes/Bulk Avg), average number of packets per bulk of forward traffic (Fwd Packet/Bulk Avg), average number of bulk rate of forward traffic (Fwd Bulk Rate Avg), average number of bytes per bulk of forward traffic (Bwd Bytes/Bulk Avg), total number of packets in the backward subflow (Subflow Bwd Packets), minimum time of connection active status (Active Min), mean time of connection active status (Active Mean), maximum time of connection active status (Active Max), and standard deviation of time of connection active status (Active Std).

Figure 6:
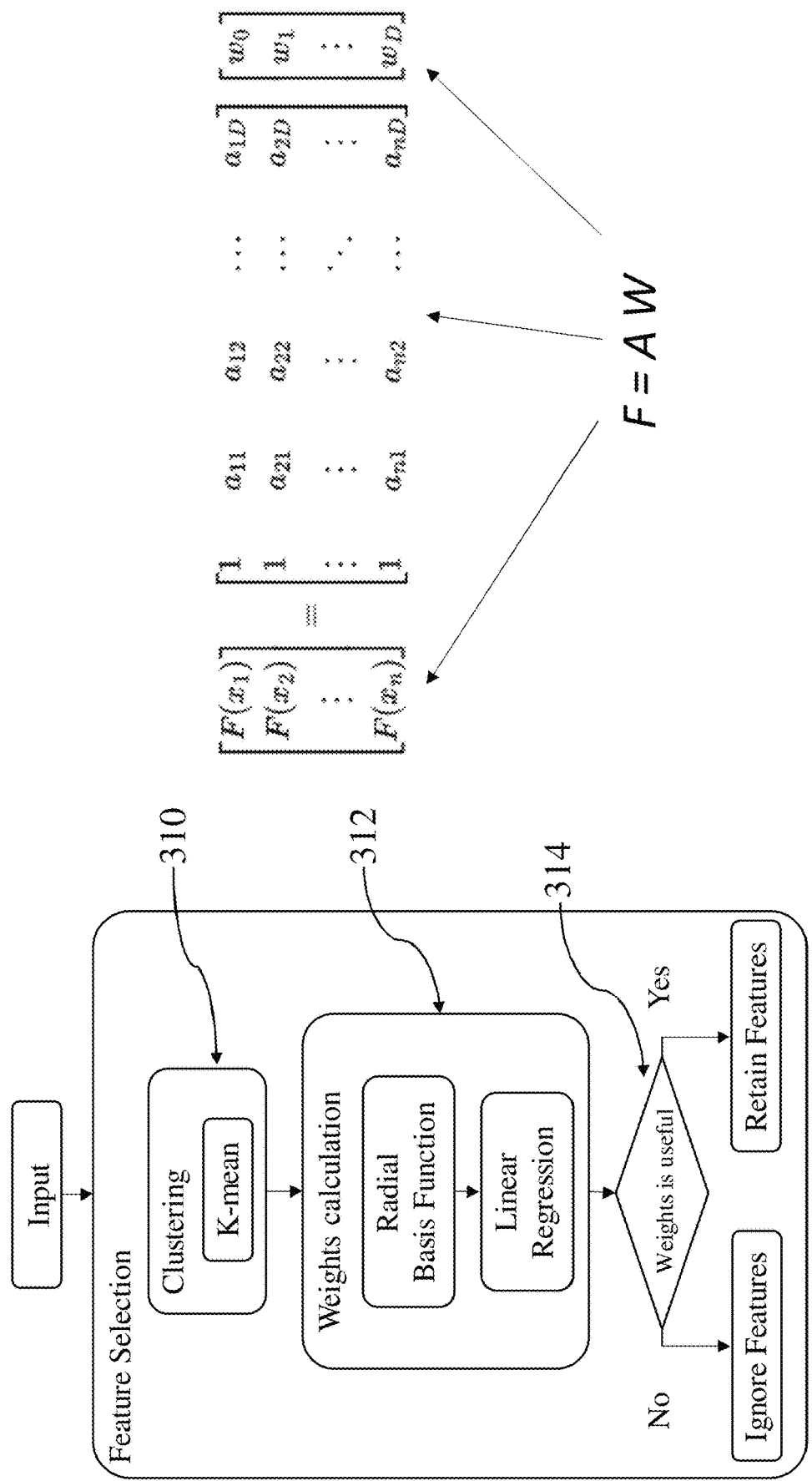
FIG. 6 depicts an illustration of a method of training a feature selection model in accordance with an embodiment of the present invention.

In accordance to one embodiment, the implementation of the feature selection model 114 includes a radial basis function neural network (RBFNN). FIG. 6 depicts an illustration of a method of training the feature selection model 114, which includes a clustering stage 310, a weights calculation stage 312, and a weight-determining stage 314.

A training dataset comprising the network traffic in packet or flow format of one or more cyber-attack simulations is obtained by parsing the network traffic packets into sessions, extracting one or more statistical network traffic features from the sessions, and calculating separately the statistical network traffic features in forward and backward directions. Then, the training dataset is inputted into the clustering stage 310, which groups the input data into clusters based on similarity using a K-means clustering algorithm to identify one or more distinct groups of input data that share similar features and can be represented by a single prototype vector.

In the weights calculation stage 312, a weight distribution is first assigned to each of the prototype vectors representing the groups of training data that share similar features based on its importance in representing the training data. The weight distribution is determined using a radial basis function, which measures the distance between the training data point and the prototype vector. After the weight distribution has been calculated using the radial basis function, a linear regression is performed to determine the output weight distribution, which involves finding the optimal coefficients that minimize the difference between the predicted output and the actual output of the RBFNN.

In one embodiment, the radial basis function is a Gaussian-based radial basis function, which can be expressed as follows:

Radial Basis Function:

$$F(x) = \sum_{k=1}^{D} w_k \cdot \Phi(\|x - c_k\|) + w_0$$

$\Phi(\|x-c_k\|)$ is the distance function from x to $c_k$

Gaussian Function:

Gaussian Function is used as a distance function to get a continuous distribution.

$$\Phi(\|x - c_k\|) = \exp\left\{-\frac{\|x - c_k\|^2}{2\sigma_k^2}\right\}$$

$$= \exp\left\{-\frac{1}{2\sigma_k^2}\|x - c_k\|^2\right\}$$

$$\therefore F(x) = \sum_{k=1}^{D} w_k \cdot \exp\left\{-\frac{1}{2\sigma_k^2}\|x - c_k\|^2\right\} + w_0$$

where:
X={$x_1$, . . . , $x_n$}∈ $\mathbb{R}^D$
C={$c_1$, . . . , $c_D$}∈ $\mathbb{R}^D$, $c_k$=Cluster center
W={$w_1$, . . . , $w_D$}∈ $\mathbb{R}^D$=Array of weights
D=number of features
F(x)∈ $\mathbb{R}$
$w_0$=Initial Bias
$s_k$=Standard deviation Gaussian-Based Radial Basis Function:

(F($x_n$)) is labelled as being corresponding to $x_n$ for n=1, . . . , N from the labelled data set; initializing each weight $w_0$, $w_1$, . . . , $w_D$ as 1; letting $a_{nk}$=$\Phi(\|xn-c_k\|)$; and obtaining F($x_n$)=$\Sigma_{k=1}^{D}w_k \cdot a_{nk}+w_0$. As shown in FIG. 6, this expression can be represented in matrix notation as F=AW so the weight distribution is obtained by W=$A^{-1}$F. and then linear regression is applied to finding the weight distribution W.

Thereafter, in the weight-determining stage 314, as the weight distribution containing weights to be assigned to the statistical network traffic features based on radial basis function is figured out, each feature can be assessed and determined whether to be retained or dropped/ignored. In this regard, only those features with non-zero weights are selected and at least one of the features assigned with zero weight is dropped or ignored.

In accordance to other embodiments, other implementations of the feature selection model 114 other than RBFNN are readily realizable by an ordinarily skilled person in the art without undue experimentation.

Referring to FIG. 2, when the network flow meta 104 is prepared, step 208, features classification, is executed by the feature classification model 116 for threat analysis. In one embodiment, the implementation of the feature classification model 116 includes a deep neutral network (DNN) trained to analyze and classify flow-based features to generate classified features, in which the training is achieved by learning features from a training dataset comprising a network traffic of one or more simulated cyber-attack events.

Figure 8:
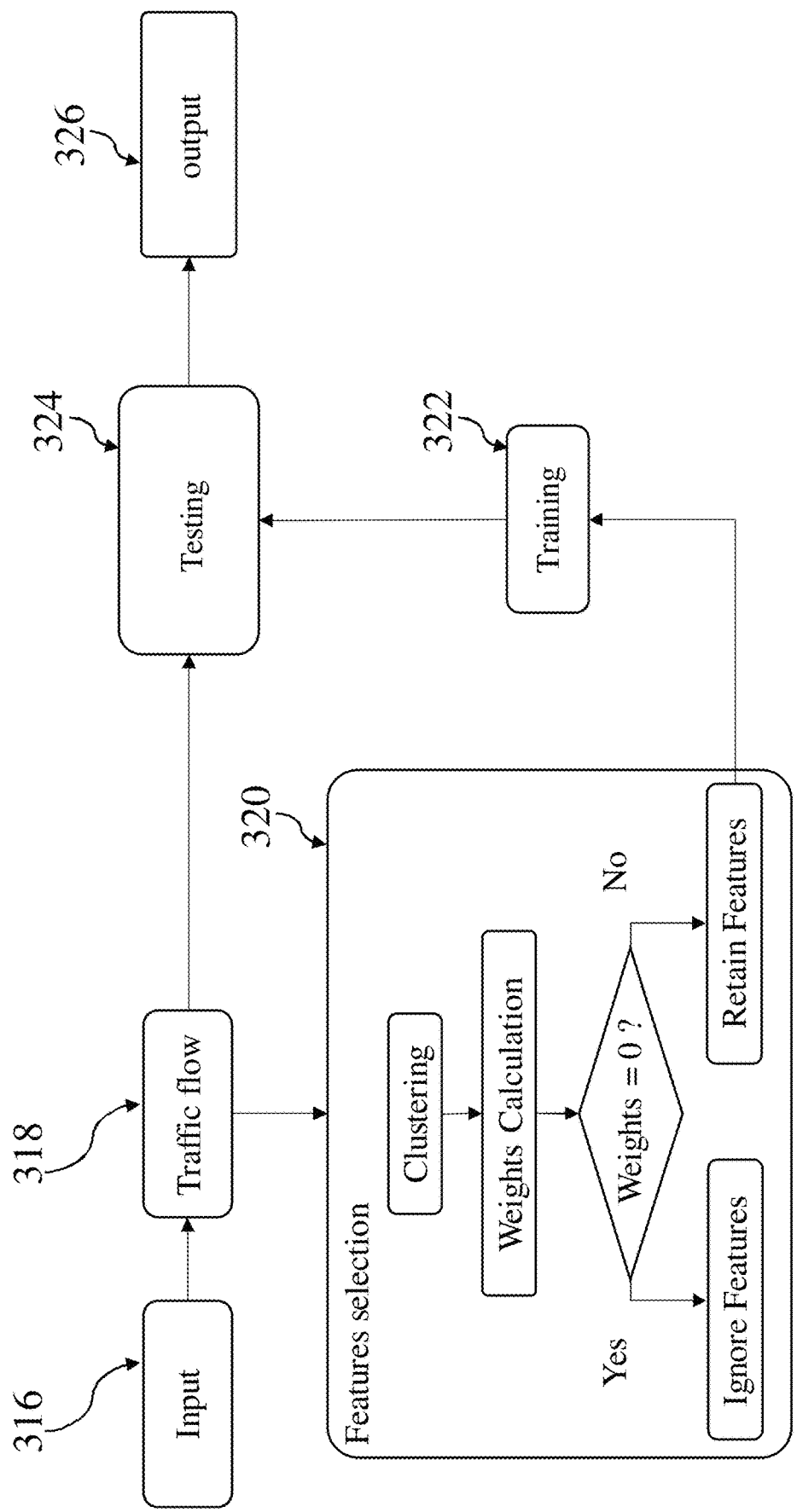
FIG. 8 depicts an illustration of a method of training a feature classification model in accordance with an embodiment of the present invention.

FIG. 8 depicts an illustration of a method of training and testing the feature classification model 116 in accordance with an embodiment of the present invention. The method includes an input stage 316, a traffic flow stage 318, a features selection stage 320, a training stage 322, a testing stage 324, and an output stage 326.

In the input stage 316, a network traffic in packet or flow format is received. In the traffic flow stage 318, one or more statistical network traffic features of the network traffic are generated by: parsing the network traffic packets into sessions, extracting the statistical network traffic features from the sessions, then calculating separately the statistical network traffic features in forward and backward directions. The statistical network traffic features are then fed to the features selection stage 320 and the testing stage 324. For training the classification model 116, the training dataset comprising the network traffic is of one or more cyber-attack simulations.

In the features selection stage 320, the statistical network traffic features are fed from the traffic flow stage 318 to the feature selection model 114 for features selection. As aforedescribed, the features selection herein involves clustering the input data to group similar data points together and calculating weights for statistical network traffic features using a radial basis function. As the RBFNN outputs weights for the statistical network traffic features, only those with non-zero weights are selected for the training stage 322, and the features with zero weights are dropped or ignored.

In the training stage 322, by using the selected statistical network traffic features as the training set, a DNN model of the classification model 116 is built and trained. The number of the selected statistical network traffic features can determine the architecture of the DNN model. As the DNN model is built after the features selection, its prediction performance can be improved by selecting more relevant features; and as such the classification model 116 can be optimized for better performance, particularly at accuracy.

In the testing stage 324, the statistical network traffic features output from the traffic flow stage 318 is fed to the trained DNN model of the feature classification model 116 for testing without any feature selection as a testing dataset. The trained DNN model is evaluated, thereby measuring accuracy of the classification model 116 with respect to characteristics of the statistical network traffic features of given cyber-attack events.

In the output stage 326, the trained DNN model is output for the feature classification model 116 to classify which known cyber-attack threat that a given cyber-attack event is corresponded to. In one exemplary embodiment of the trained DNN model, the number of input layers is D (i.e., the number of the selected features); the number of hidden nodes/layers is 2D+1; and the number of the output nodes is the number of known cyber-attack threats.

Referring again to FIGS. 1 and 2, the classified features generated by the feature classification model 116 comprising indications of one or more classified cyber-attack threats and their counts are fed to the threat computation model 118 and the cyber threat intelligence engine 120.

Step 210 is executed by the threat computation model 118 for threat prediction. In one embodiment, the threat computation model 118 is configured to predict one or more threat features from the classified features output from step 208, which comprise indications of one or more classified cyber-attack threats and their counts, using a linear regression model. More specifically, the counts of the classified cyber-attack threats serve as a set of dependent variables and time (the corresponding times of occurrences or recordings of the classified cyber-attack threats) as the independent variables to the linear regression model in calculating the threat features. In other words, the classified features can be viewed as indications of cyber-attack threats occurred or recorded at different times, and the threat computation model 118 using the linear regression model is to predict one or more cyber-attack threats to be occurred in a future time period (the threat features) from the counts of the cyber-attack threats that have occurred or recorded during a certain time window.

In this embodiment, a method of training the threat computation model 118 includes the steps as follows: obtaining a training dataset comprising a plurality of statistical network traffic features across multiple time periods over many days (i.e., multiple months); inputting a first set of the statistical network traffic features stamped with a first time period as a set of independent variables to the linear regression model of the threat computation model and inputting a second set of the statistical network traffic features stamped with a second time period as a set of dependent variables to the linear regression model, wherein the second time period continuously follows the first time period; identifying a linear relationship between independent variables and dependent variables of the linear regression model; and generating a linear function for the linear regression model based on the identified linear relationship.

In other embodiments, the threat computation model 118 is built on other possible prediction models that are readily realizable by an ordinarily skilled person in the art without undue experimentation.

Referring again to FIGS. 1 and 2, the network flow meta, the classification result, and the prediction result, are fed to the cyber threat intelligence engine 120 for generating cyber threat intelligence. More specifically, the cyber threat intelligence engine 120 is configured to collect and combine the flow-based features of network flow meta 104, the classified features generated by the feature classification model 116, and the threat features predicted by the threat computation model 118 to form one or more cyber threat joint features.

In one embodiment, the cyber threat joint features can be sent to the user interface 122 so users can perform further analysis according to the generated cyber threat intelligence. Via the user interface 122, the cyber threat intelligence engine 120 is further configured to send an alert or a warn signal in response to the cyber threat joint features to report one or more specific cyber-attack events, such as a DDOS attack event.

In one embodiment, the cyber threat intelligence engine 120 is further configured to feed the cyber threat joint features to the monitoring system 124 for outputting the cyber threat joint features. For example, the monitoring system 124 is configured to visualize the cyber threat joint features into plots or graphs for displaying. In some embodiments, according to the cyber threat joint features, the monitoring system 124 can visualize the following information as graphs or plots: Attacks by Country Histogram; Attacker Src IP Reputation; Attacks by Country; Attacks by Country and Port; Top 10 Attacker ISP; Attacker Source IP Count; Total no. of unique Attacker IP; Top 10 Total Attacks; Threat Analysis Result; Threat Prediction Result; accordingly, user can easily understand the result provided by the ML-based apparatus 100.

The functional units and modules of the apparatuses and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for analyzing and monitoring a network flow for cyber threat intelligence, comprising:
   a feature extraction model executed by at least one processor and configured to extract one or more flow-based features from the network flow to form a network flow dataset;
   a feature selection model implemented by a radial basis function neural network (RBFNN), executed by at least one processor, and configured to select from the network flow dataset to generate network flow meta, wherein the network flow meta comprises flow duration, total number of forward packets, total number of backward packets, and one or more of flow-based statistical network traffic features;
   a feature classification model executed by at least one processor and configured to analyze and classify the flow-based features of the network flow meta to generate one or more classified features;
a threat computation model executed by at least one processor and configured to predict one or more threat features from the classified features using a swappable prediction model;
a cyber threat intelligence engine executed by at least one processor and configured to collect and combine the flow-based features, the classified features, and the threat features to form one or more cyber threat joint features; and
a monitoring system executed by at least one processor and configured to output the cyber threat joint features.

2. The apparatus of claim 1,
wherein the prediction model of the threat computation model is a linear regression model;
wherein the classified features comprise indications of one or more classified cyber-attack threats and their counts;
wherein the indications of the classified cyber-attack threats serve as a set of dependent variables to the linear regression model, and corresponding times of occurrences or recordings of the classified cyber-attack threats serve as independent variables to the linear regression model; and
wherein the linear regression model predicts one or more cyber-attack threats to be occurred in a future time period to be output as the threat features from the counts of the cyber-attack threats that have occurred or recorded during a time window.

3. A method for training the threat computation model of the apparatus of claim 2, comprising:
obtaining a training dataset comprising a plurality of statistical network traffic features across multiple time periods;
inputting a first set of the statistical network traffic features stamped with a first time period as a set of independent variables to a linear regression model of the threat computation model and inputting a second set of the statistical network traffic features stamped with a second time period as a set of dependent variables to the linear regression model, wherein the second time period continuously follows the first time period;
identifying a linear relationship between independent variables and dependent variables of the linear regression model; and
generating a linear function for the linear regression model based on the identified linear relationship.

4. The apparatus of claim 1, further comprising:
a flow detector executed by at least one processor and configured to determine whether network raw data is in a network flow type; and
a feature extraction model executed by at least one processor and configured to extract the flow-based features from the network raw data when the network raw data is not in a network flow type and to output extraction into the network flow dataset.

5. The apparatus of claim 1, wherein the cyber threat intelligence engine is further configured to feed the cyber threat joint features to the monitoring system, and wherein the monitoring system is further configured to visualize the cyber threat joint features into plots or graphs for displaying.

6. The apparatus of claim 1, wherein the cyber threat intelligence engine is further configured to send an alert or a warn signal in response to the cyber threat joint features to report one or more specific cyber-attack events.

7. The apparatus of claim 1, wherein the feature classification model is at least implemented by a deep neutral network (DNN).

8. A method for training the feature selection model of the apparatus of claim 1, comprising:
obtaining a training dataset comprising network traffic of one or more cyber-attack simulations;
parsing the training dataset into sessions;
extracting statistical network traffic features from the sessions;
calculating separately statistical network traffic features in forward and backward directions;
calculating weights to be assigned to the statistical network traffic features; and
dropping a group of the statistical network traffic features which are assigned as zero weight by the feature selection model.

9. The method for training of claim 8, wherein the group of the statistical network traffic feature comprises backward packet PSH flags, forward packet URG flags, backward packet URG flags, total number of packets with the URG flag set, average number of bytes per bulk of forward traffic, average number of packets per bulk of forward traffic, average number of bulk rate of forward traffic, average number of bytes per bulk of forward traffic, total number of packets in the backward subflow, minimum time of connection active status, mean time of connection active status, maximum time of connection active status, standard deviation of time of connection active status, or combinations thereof.

10. A method for training the feature classification model of the apparatus of claim 1, comprising:
obtaining a training dataset comprising of network traffic of one or more known cyber-attack events;
feeding statistical network traffic features of the training dataset to feature selection so as to reduce the number of the statistical network traffic features;
training a deep neutral network (DNN) model of the feature classification model using the selected statistical network traffic features; and
feeding the statistical network traffic features of the training dataset to the DNN model for testing without any feature selection, so as to evaluate the DNN model on a subset of the selected statistical network traffic features, thereby measuring and adjusting a weight distribution of the DNN model related to characteristics of the statistical network traffic features of the known cyber-attack events.

11. The apparatus of claim 1, wherein the flow-based statistical network traffic features comprise: backward packet PSH flags (Bwd PSH Flags), forward packet URG flags (Fwd URG Flags), backward packet URG flags (Bwd URG Flags), total number of packets with the URG flag set (URG Flag Count), average number of bytes per bulk of forward traffic (Fwd Bytes/Bulk Avg), average number of packets per bulk of forward traffic (Fwd Packet/Bulk Avg), average number of bulk rate of forward traffic (Fwd Bulk Rate Avg), average number of bytes per bulk of forward traffic (Bwd Bytes/Bulk Avg), total number of packets in the backward subflow (Subflow Bwd Packets), minimum time of connection active status (Active Min), mean time of connection active status (Active Mean), maximum time of connection active status (Active Max), and standard deviation of time of connection active status (Active Std).

12. A method for analyzing and monitoring a network flow for cyber threat intelligence, comprising:

extracting, under a feature extraction model executed by at least one processor, one or more flow-based features from the network flow to form a network flow dataset;

selecting, under a feature selection model implemented by a radial basis function neural network (RBFNN) executed by at least one processor, from the network flow dataset to generate network flow meta, wherein the network flow meta comprises flow duration, total number of forward packets, total number of backward packets, and one or more of flow-based statistical network traffic features;

analyzing and classifying, under a feature classification model executed by at least one processor, the flow-based features of the network flow meta to generate one or more classified features;

predicting, under a threat computation model executed by at least one processor, one or more threat features from the classified features based on a swappable prediction model;

collecting and combining, by at least one processor, the flow-based features, the classified features, and the threat features to form one or more cyber threat joint features; and outputting, by at least one processor, the cyber threat joint features onto a monitoring system.

13. The method of claim 12, wherein the swappable prediction model of the threat computation model is a linear regression model;

wherein the classified features comprise indications of one or more classified cyber-attack threats and their counts;

wherein the indications of the classified cyber-attack threats serve as a set of dependent variables to the linear regression model, and corresponding times of occurrences or recordings of the classified cyber-attack threats serve as independent variables to the linear regression model; and wherein the linear regression model predicts one or more cyber-attack threats to be occurred in a future time period to be output as the threat features from the counts of the cyber-attack threats that have occurred or recorded during a time window.

14. The method of claim 12, further comprising:

feeding the cyber threat joint features to the monitoring system; and visualizing the cyber threat joint features into plots or graphs for displaying.

15. The method of claim 12, further comprising:

sending an alert or a warn signal in response to the cyber threat joint features to report one or more specific cyber-attack events.

16. The method of claim 12, wherein the flow-based statistical network traffic features comprise: backward packet PSH flags (Bwd PSH Flags), forward packet URG flags (Fwd URG Flags), backward packet URG flags (Bwd URG Flags), total number of packets with the URG flag set (URG Flag Count), average number of bytes per bulk of forward traffic (Fwd Bytes/Bulk Avg), average number of packets per bulk of forward traffic (Fwd Packet/Bulk Avg), average number of bulk rate of forward traffic (Fwd Bulk Rate Avg), average number of bytes per bulk of forward traffic (Bwd Bytes/Bulk Avg), total number of packets in the backward subflow (Subflow Bwd Packets), minimum time of connection active status (Active Min), mean time of connection active status (Active Mean), maximum time of connection active status (Active Max), and standard deviation of time of connection active status (Active Std).

* * * * *